(No Model.)

J. FLETCHER.
APPLIANCE FOR USE IN SOLDERING ARTIFICIAL TEETH TO MOUTH PLATES.

No. 586,023. Patented July 6, 1897.

Witnesses
John C. Wilson
D. H. Blakelock

Inventor
John Fletcher,
by Whitman & Wilkinson,
Attorneys

UNITED STATES PATENT OFFICE

JOHN FLETCHER, OF BRISTOL, ENGLAND.

APPLIANCE FOR USE IN SOLDERING ARTIFICIAL TEETH TO MOUTH-PLATES.

SPECIFICATION forming part of Letters Patent No. 586,023, dated July 6, 1897.

Application filed December 7, 1896. Serial No. 614,792. (No model.)

*To all whom it may concern:*

Be it known that I, JOHN FLETCHER, a subject of the Queen of Great Britain and Ireland, residing at Bristol, England, have invented a certain new and useful Appliance for Use in Soldering Artificial Teeth to Mouth-Plates, of which the following is a specification.

The appliance which constitutes this invention consists of a bracket or carrier free to rotate and designed to receive a tray adapted to take investments with the teeth in place, and which tray is attachable to and detachable from the said carrier. Upon this tray, when detached, is placed the investment with the teeth in place, and the tray with its contents is heated over a Bunsen burner or by a stove. When sufficiently heated, the tray is placed upon the carrier and clamped by a clamping-pin or other suitable catch.

The investment-tray carrier is supported on a suitable handle and is turned about by the operator, who is thus enabled to bring the soldering-flame to bear directly on any part of the work.

The investment-tray carrier is rotated by any suitable means, such as by means of a rack and pinion, as hereinafter described, the rack being moved backward and forward longitudinally at the will of the operator.

My invention will be understood by reference to the accompanying drawings, wherein the same parts are indicated by the same letters throughout the several views.

Figure 1:
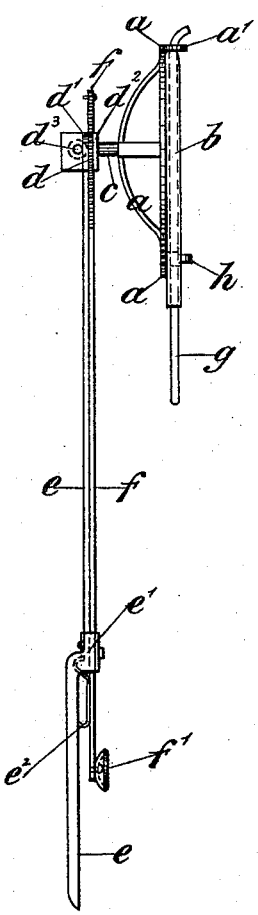
Figure 2:
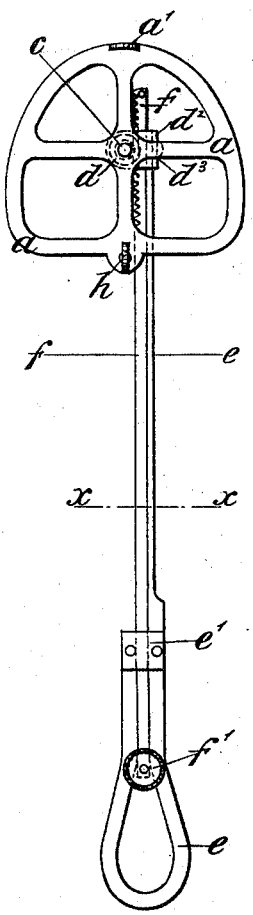
Figure 3:
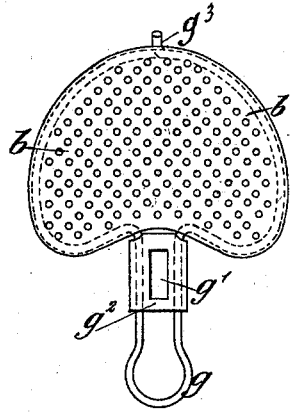

Figure 1 represents a side elevation of my improved dental appliance for holding and rotating the investment-tray. Fig. 2 is a plan view of the devices shown in Fig. 1, with the investment-tray removed. Fig. 3 is a plan view of the investment-tray removed from the carrier, and Fig. 4 is a section taken on the line $x\ x$ in Fig. 2 and looking toward the top of the sheet.

$a$ represents the carrier or bracket for carrying the investment-tray $b$. This bracket $a$ is rigidly secured upon the spindle $c$, which is rotatably mounted in a pair of lugs $d'$ and $d^2$, one of which lugs, $d'$, is preferably integral with the arm $e$, while the other lug, $d^2$, is secured to said lug $d'$ by means of a screw $d^3$, as shown in Figs. 1 and 2, or by any other suitable means. A pinion $d$ is rigidly mounted upon the spindle $c$ between the said lugs $d'$ and $d^2$.

Figure 4:
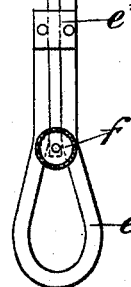

$e$ represents a straight arm or handle having a longitudinal groove at one side thereof, in which groove lies the rack-bar $f$, as shown most clearly in Figs. 2 and 4. This rack-bar has teeth thereon, which mesh with the pinion $d$. The said rack-bar passes through a guide formed by the lugs $d'$ and $d^2$ at the end thereof next said pinion, and near its opposite end passes through a guide $e'$ on the arm or handle $e$, and has rigidly mounted upon the latter end a milled-edged button or stud $f'$, by means of which the said rack-bar may be moved longitudinally in either direction through its guides by a simple pressure of the thumb or finger and at the will of the operator. By the backward-and-forward movement of the rack-bar $f$ the tray-carrier $a$ may be rotated in either direction, as desired.

$b$ represents the investment-tray, which consists of a perforated copper plate slightly "dished" or concaved and secured at its edges by being bent over upon a wire frame, which frame is in outline approximately heart-shaped, as shown in Fig. 3.

At the base of the tray the wire frame is formed into a handle $g$, and a plate $g^2$, having a central slot $g'$ therein, is secured upon said handle adjacent to the base of the tray. At the top or point of the tray one end of the wire of the frame thereof is bent outward and curved forward slightly to form a hooked stud, as shown at $g^3$ in Fig. 3.

The carrier-frame $a$ is provided at its top side or point with a fixed eye $a'$, which is adapted to be engaged by the hooked stud $g^3$ on the investment-tray, and at its base carries a rotatable clamping-pin which is adapted to engage in the slot $g'$ in the plate $g^2$ on the investment-tray in attaching the said investment-tray to the carrier-frame.

In practically using the appliance in soldering artificial teeth the tray $b$, having been detached from the carrier $a$, is, bearing the investment and teeth, subjected to the action of heat from a Bunsen burner or stove, and when the investment and teeth have been heated to the required degree the tray-handle $g$ is grasped between tongs or the like and the tray $b$ returned to the carrier $a$ and hooked to the eye $a'$ and clamped by the clamping-pin $h$, fixed to the bracket $a$ and projecting through the slot $g'$ in the plate $g^2$, extended across the handle $g$. The operator then by means of the thumb bearing on the milled-edged button or stud $f'$ actuates the rack $f$ backward or forward, and thus, through the medium of the pinion $d$, turns the carrier $a$ and the investment-tray $b$ with it, and by this means the operator is, without change of position, enabled to readily direct the soldering-flame directly to bear on any desired point in the operation of soldering the teeth to the mouth-plate.

The appliance facilitates and expedites the operation of soldering teeth, and the investment-tray is more durable than the reticulated wire devices hitherto used.

I do not wish to limit myself to the precise details of construction hereinbefore described, as many modifications thereof might be made which could be used without departing from the spirit of my invention.

Having now described my invention, what I claim as new, and desire to secure by Letters Patent, is—

1. In a device for use in soldering artificial teeth to mouth-plates, the combination with a holding-arm; a carrier-frame rotatably mounted at one end thereof and a handle for grasping the same provided at the opposite end; means carried by said holding-arm for rotating said carrier-frame; and means provided upon said carrier-frame for the attachment of the investment-tray, substantially as described.

2. In a device for use in soldering artificial teeth to mouth-plates, the combination with a holding-arm; a carrier-frame rotatably mounted at one end thereof and a handle for grasping the same provided at the opposite end; a pinion connected rigidly with said carrier-frame; a rack-bar carried by said holding-arm having teeth meshing with said pinion; means whereby said rack-bar may be moved longitudinally; and means provided upon said carrier-frame for the attachment of the investment-tray, substantially as described.

3. In a device for use in soldering artificial teeth to mouth-plates, the combination with a holding-arm; a carrier-frame fixed upon a spindle journaled in one end of said holding-arm; a pinion also fixed upon said spindle; a rack-bar mounted in guides upon said holding-arm, and having teeth thereon meshing with said pinion; a handle on said holding-arm; and a button or stud on said rack-bar by which the same may be moved, substantially as described.

4. In a device for use in soldering artificial teeth to mouth-plates, the combination with a holding-arm; a carrier-frame rotatably mounted at one end thereof, and a handle provided at the opposite end; means carried by said holding-arm for rotating said carrier-frame; an eye on said carrier-frame; a clamping-pin also mounted on said carrier-frame; of an investment-tray provided with a hooked stud adapted to engage said eye on the carrier-frame, and having a handle provided with a slot adapted to be engaged by said clamping-pin on said carrier-frame, substantially as described.

5. An investment-tray for use in soldering artificial teeth to mouth-plates, comprising a plate of suitable metal secured upon a frame provided with means for attaching the same to and detaching it from, the carrier-frame, substantially as described.

6. An investment-tray for use in soldering artificial teeth to mouth-plates, comprising a metallic plate secured upon a wire frame, the said wire frame being bent to form a handle, and having a slotted plate thereon adapted to be engaged by a clamping-pin on the carrier-frame, and the said frame being also provided with a hooked stud adapted to engage an eye on said carrier-frame, substantially as described.

In witness whereof I have hereunto set my hand in the presence of two witnesses.

JOHN FLETCHER.

Witnesses:
   FRANK FLETCHER,
   WILLIAM HENRY DAVIES.